WILLIAM L. McDOWELL.
Improvement in Cooking-Stoves.

No. 114,838. Patented May 16, 1871.

Witnesses:
Benj. Monson
Wm. H. Monson.

Inventor:
W. L. McDowell

United States Patent Office.

WILLIAM L. McDOWELL, OF PHILADELPHIA, PENNSYLVANIA.

Letters Patent No. 114,838, dated May 16, 1871.

IMPROVEMENT IN COOKING-STOVES.

The Schedule referred to in these Letters Patent and making part of the same.

I, WILLIAM L. MCDOWELL, of the city of Philadelphia, in the State of Pennsylvania, have invented certain Improvements in the Attachment of Boiling Vessels to Stoves, of which the following is a specification.

Nature and Objects of the Invention.

My invention relates to those removable boiling vessels which communicate with the fire-chambers of cooking-stoves by tubes extending therefrom into and around the fire-chambers through holes made for the purpose in the side plates; and My invention consists of a flat, wide, rectangular chamber communicating with the interior of a boiling vessel and forming part of the same, so as to project horizontally from the one side into the fire-chamber through a corresponding rectangular opening in the plate and fire-lining, which together form the side wall of the fire-box, the said boiling vessel being supported safely upon a removable oven, having an open side, which will, when applied, fit closely against the said side plate of the fire-chamber, and thus be accurately closed thereby, and the oven heated by direct radiation from the said plate.

Description of the Accompanying Drawing.

Figure 1:
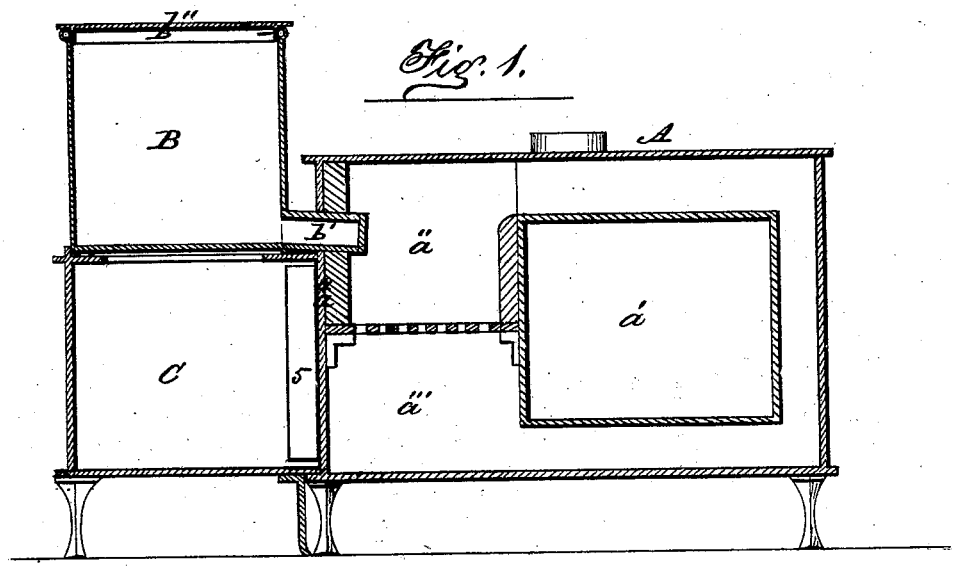
Figure 1 is a vertical central section, above the dotted line $v\ w$ of fig. 2, of a cooking-stove with my improvements attached thereto.
Figure 2:
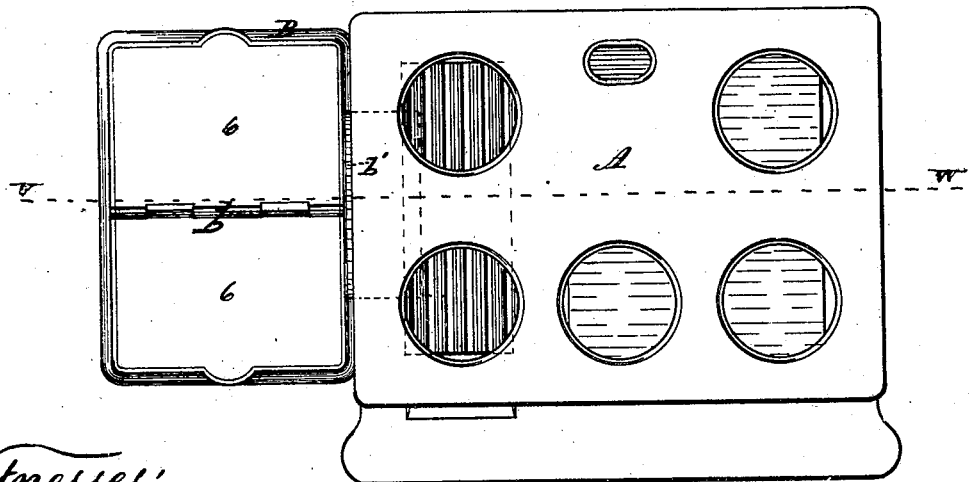
Figure 2 is a plan view of the upper side or top plate of the stove and of the boiling vessel, connected together in the same manner as is represented in fig. 1.

General Description.

The stove A is of the usual flat-top form of a cooking-stove, having the usual baking-oven $a'$ in one side, and the fire-box $a''$ and ash-pit $a'''$ in the opposite side.

The boiling vessel B is in the form of a wash-boiler, but has a hollow intercommunicating flat chamber, $b'$, which, forming a fixed part of the said vessel, projects horizontally from one side, and with its bottom in the same horizontal plane with the bottom of the vessel, and is made to enter easily through a corresponding opening in the side plate $a^4$, and through the lining, if any be used, in the fire-box $a''$ of the stove, so as to expose its entering end directly to the action of the products of the combustion of the fuel within the said fire-box, when the said boiling vessel B is securely supported for the purpose at a suitable height in relation to the same.

The removable cover $b''$ consists of two flat plates of cast-iron, articulated together so as to form a cover in two connected halves, each half being provided with bottom flanges, which will cause it to fit accurately around in the mouth of the boiler B, and at the same time allow of an easy removal of both together, or of the turning upward of either upon the other, as access to the interior of the boiler may require.

The plate $a^4$ may be cast thick enough to render the application of the usual fire-brick lining unnecessary, and at the same time to afford increased heating effect upon the attached cover $b$.

The oven C is made entirely open at one side, and is supported upon suitable legs or feet with its said open side closed by contact with the side plate $a^4$, which latter has suitable narrow flanges, 5, cast upon it so that they may enter the open side of the said oven, and, fitting closely against the sides of the oven-plates thereat, thus produce sufficiently close joints between the said oven-chamber and the plate $a^4$ of the stove, while the top plate of the said oven C receives directly upon it the bottom of the boiling vessel B, and thus supports the latter at the proper height to suit the adjustable connection of its projecting chamber $b'$ with the fire-box $a''$.

The front of the removable oven C is intended to be fitted with a door or doors to give access to the interior, as occasion may require.

I do not desire to claim, broadly, the arrangement at the side of a cooking-stove of a removable oven, supporting a boiler communicating with the interior of the fire-chamber by means of tubes passing through the side or back plates of the stove; but what I desire to secure by Letters Patent is confined to the following claim.

I claim as my invention—

A removable boiler, B, having a projecting, flat, rectangular chamber, $b'$, made to enter the fire-chamber through the side plate $a^4$ of the fire-chamber thereof, and the supporting oven C, having one side made open and to fit against the said side plate of the fire-chamber, as and for the purposes hereinbefore set forth and described.

WM. L. McDOWELL.

Witnesses:
W. D. BENNAGE,
F. LEIBRANDT, Jr.